US008386782B2

(12) United States Patent
Nyberg et al.

(10) Patent No.: US 8,386,782 B2
(45) Date of Patent: Feb. 26, 2013

(54) AUTHENTICATED GROUP KEY AGREEMENT IN GROUPS SUCH AS AD-HOC SCENARIOS

(75) Inventors: Kaisa Nyberg, Helsinki (FI); Nadarajah Asokan, Espoo (FI)

(73) Assignee: Nokia Corporation, Espoo (FI)

( * ) Notice: Subject to any disclaimer, the term of this patent is extended or adjusted under 35 U.S.C. 154(b) by 1396 days.

(21) Appl. No.: 11/649,812

(22) Filed: Jan. 5, 2007

(65) Prior Publication Data

US 2007/0186109 A1      Aug. 9, 2007

(30) Foreign Application Priority Data

Feb. 2, 2006   (EP) .................................... 06101223

(51) Int. Cl.
*H04L 29/06*  (2006.01)
(52) U.S. Cl. ................ 713/171; 726/3; 726/14; 726/19; 726/26; 726/27; 726/29; 713/156; 713/160; 713/161; 713/162; 713/163; 713/170; 713/176; 713/181; 380/28; 380/30
(58) Field of Classification Search ................... 726/1, 7, 726/14, 15, 19, 22, 26, 27, 29; 713/151, 713/153, 160–163, 168, 170, 171, 183, 184, 713/189; 380/28, 30
See application file for complete search history.

(56) References Cited

U.S. PATENT DOCUMENTS

| 2002/0186846 | A1 | 12/2002 | Nyberg et al. | |
|---|---|---|---|---|
| 2004/0221287 | A1* | 11/2004 | Walmsley | 718/100 |

OTHER PUBLICATIONS

Ateniese et al., "Authenticated Group Key Agreement and Friends", 1998, pp. 17-26, CCS '98 Proceedings of the 5th ACM conference on Computer and Communications Security.*

Serge Vaudenay, "Secure Communications Over Insecure Channels Based on Short Authenticated Strings", CH-1015, Lausanne, Switzerland, pp.
U.S. Appl. No. 11/242,374, filed Oct. 3, 2005, "System, Method and Computer Program Product For Authenticating a Data Agreement Between Network Entities", pp. 1-39.
N. Asokan et al., "Key Agreement in Ad-Hoc Networks", Feb. 3, 2000, pp. 1-22.
Sven Laur et al., "Efficient Mutual Data Authentication Using Manually Authenticated Strings", Helsinki University of Technology, Finland.
International Search Report, filed Jan. 26, 2007, International Application No. PCT/IB2007/050275.
Gehrmann, et al., "Manual Authentication for Wireless Devices", Jan. 23, 2004, pp. 29-37, XP-002439180.
Shengli Liu, et al., "ID-Based Tripartite Key Agreement Protocol with Pairings", ISIT Yomohama, Japan, Jun. 29-Jul. 4, 2003, p. 136.
Giuseppe Ateniese, et al., "New Multiparty Authentication Services and Key Agreement Protocols", IEEE Journal on Selected Areas in Communications, IEEE Service Center, Piscataway, US, Apr. 2000, pp. 628-639.
Schneier B: "Applied cryptography, Passage" Applied Cryptography. Protocols, Algorithms, and Source Code Inc., New York, John Wiley & Sons, US, 1996, p. 514, XP002276680.
SHA-256 (defined in the FIPS-180-2 documents by the US National Institute of Standards and Technology, http://csrc.nist.gov/CryptoToolkit/tkhash.html); Aug. 1, 2002.

* cited by examiner

*Primary Examiner* — Brandon Hoffman
*Assistant Examiner* — Hee Song
(74) *Attorney, Agent, or Firm* — Harrington & Smith

(57) ABSTRACT

The invention provides a method, system, device and computer program product for setting up a secure session among three or more devices or parties of a communication group, including authenticating a key agreement between the devices or parties of the communication group, wherein the devices of the group start, preferably after a key is computed or agreed, a protocol, preferably a multi-party data integrity protocol, for authenticating the key agreement.

20 Claims, No Drawings

AUTHENTICATED GROUP KEY AGREEMENT IN GROUPS SUCH AS AD-HOC SCENARIOS

FIELD AND BACKGROUND OF THE INVENTION

The invention generally relates to providing security, and discloses possibilities for the formation of a security association among devices of a group such as a user group formed by non-expert users.

The two-party case of this problem of forming a secure connection has been studied extensively, and is sometimes referred to as the "First Connect" problem.

The present invention relates to a multi-party case with two or more participants which are able to communicate with each other using wireless communication such as short-range radio communication. The invention further relates to security in networks or groups such as close proximity networks or closed-user-groups, CUG, or in ad-hoc networks, such as Local Area Networks, LANs, or WLANs, Wireless LANs.

A problem may arise when several people are for instance in a meeting room or other environment and want to establish a secure communication session, preferably wireless session, among their personal devices such as laptops, computers, or mobile communication devices such as mobile phones. When there is no prior context (like certificates issued by a common central authority, CA), or no experienced security administrator at hand to help, a problem is to find a user-friendly means of establishing a common security association, SA, that can be used to protect the communication among the devices. A security association consists of the cryptographic keys and other information needed to cryptographically protect communication.

Similar scenarios may also arise in multiplayer games, personal network of multiple devices etc.

Authenticating a multi-party Diffie-Hellman key agreement using a shared short password is known, see Asokan and Ginzboorg, "Key agreement in ad hoc networks", Computer Communications, April 2000, for reference.

Authenticating two-party Diffie-Hellman using non-secret checksums is also known, see Serge Vaudenay, "Secure Communications over Insecure Channels Based on Short Authenticated Strings", Advances in Cryptology—CRYPTO 2005, Lecture Notes in Computer Science, LNCS vol. 3621, Springer-Verlag, pp. 309-326, 2005".

A U.S. Patent Application filed in U.S. Mar. 10, 2005, title "System, Method And Computer Program Product For Authenticating A Data Agreement Between Network Entities", also discloses a manner of authenticating a data agreement between network entities.

The disclosure contents of this US Patent Application, as well as of the above mentioned articles of Asokan and Ginzboorg, "Key agreement in ad hoc networks", Computer Communications, April 2000, and Serge Vaudenay, "Secure Communications over Insecure Channels Based on Short Authenticated Strings", Springer-Verlag, pp. 309-326, 2005, is herewith incorporated into the present application to full extent.

SUMMARY OF THE INVENTION

The invention provides a method, system, devices and network elements as defined in the claims.

Further, the invention provides a method, system and device for authenticating a multi-party key agreement, preferably using non-secret checksums only.

The invention shows ways of authenticating a group of devices so that they can perform e.g. authenticated group Diffie-Hellman key agreement. Preferably, this is done by extending the interactive data authentication protocol approach by Vaudenay, CRYPTO 2005, see above, to the multi-party case.

The invention provides a method, system device and product, for setting up a secure session among three or more devices or parties of a communication group, including authenticating a key agreement between the devices or parties of the communication group. The devices of the group start a protocol, preferably a multi-party data integrity protocol, for authenticating the key agreement. The devices of the group start the protocol preferably after the key is computed or agreed. There may be variations where this protocol can be done or started even before the key is agreed.

The invention provides an easy reliable and secure formation of a security association among devices of users such as non-expert users. The present invention primarily relates to the multi-party case of three or more participants, without being restricted thereto.

The invention shows possibilities of how to authenticate a group of devices so that they can perform e.g. authenticated group Diffie-Hellman key agreement.

The present invention allows an easy and secure formation of a security association among devices by non-expert users, in a multi-party case.

Further aspects, advantages and details of embodiments of the invention will be described in the following.

In an embodiment of the invention, a basic multi-party data integrity protocol is used. This multi-party data integrity protocol includes the following features and steps.

1. Devices share a data D, for which they want to verify that it is the same in all devices.

The following steps 2-7 are performed by all devices $D_i$ ($i=1 \ldots n$) equally.

2. Device $D_i$ picks a fresh 256-bit random number $R_i$, computes a commitment to $R_i$, in the form of $h_i = h(R_i)$, and broadcasts $h_i$.

3. $D_i$ waits until it has received the values $h_j$ ($j=1 \ldots n, j \neq i$) from all other devices.

4. $D_i$ now broadcasts $R_i$.

5. $D_i$ checks that for each $j$ ($j=1 \ldots n, j \neq i$), $h_j$ received in step 3 is equal to $h(R_j)$. If the check fails in any case, $D_i$ aborts.

6. If the check in step 5 succeeds, $D_i$ calculates $f(R_1, R_2, \ldots R_n, M)$. M is a unique representation of the data D, such that if D is changed, then with high probability, there is also a change in M. The output of $f(\ )$ is a short numeric string, e.g., four digits. $D_i$ displays the string and prompts for user accept/reject.

7. If the user accepts, $D_i$ accepts D.

In the above, $h(\ )$, $h(\ )$ is a cryptographic commitment function. In practice, it can be a one-way hash function like SHA-256 (defined in the FIPS-180-2 document by the US National Institute of Standards and Technology, http://csrc.nist.gov/CryptoToolkit/tkhash.html); and $f(\ )$ is a function with a short output. This function $f(\ )$ can, for example be HMAC_SHA256 (XOR($R_1, R_2, \ldots R_n$); M) or SHA_256 ($R_1, R_2, \ldots R_n$; M) truncated to a four digit number.

Steps 3, where $D_i$ waits until it receives the broadcast message from all parties in the previous step is critical to the security. This technique is also applicable to other multiparty authenticated key agreement protocols, where authentication is based on a common shared secret password.

A key agreement used in the invention may e.g. be a Multiparty authenticated Diffie-Hellman key agreement. This key agreement will be described below.

A group of devices Di (i=1 ... n) compute, or have computed, a shared secret Diffie-Hellman key DHKey. The devices preferably are user devices such as computers, laptops, mobiles etc which want to form, or enter into, an ad-hoc group, that is a temporary group of devices communicating with each other. There are known methods for doing this computation. A straightforward method is the following.

All devices Di perform the following steps equally:

1.) Di has a private key ai and a public key $g^{ai}$. Device Di sets $Mi0=g^{ai}$.

For each j=1 ... n−1, the following steps 2.), 3.) are carried out:

2.) Di sends Mi(j−1) to D(i+1), (here D(n+1)=D1).

3.) Di computes $Mij=M(i-1)(j-1)^{ai}$

Then Mi (n−1) is equal to the shared secret Diffie-Hellman key $DHKey=g^{a1\ a2\ \cdots\ an}$, for all i=1 ... n.

After the Diffie-Hellman key is computed, the devices set M=DHKey, and start the multi-party data integrity protocol described above.

Similarly, this key authentication method using the data integrity protocol can be applied to any non-authenticated multi-party public key based key-agreement method.

In another embodiment of the invention, the authenticated key agreement protocol can be the same as the one described above, but in which instead of M=DHKey, M is set as follows: $M=(g^{A1}, g^{A2}, \ldots, g^{An})$, where $Ai=(ai)^{-1}$ (a1. a2 ... an).

An exemplary implementation of embodiments of the invention may include the following features or steps.

Example sequence of user actions are as follows:

1. The users of the group to be formed initiate association on each of the devices, e.g., by pressing a button on each device.

2. The devices engage in the protocol or features/steps described above, and each generates and e.g. displays a short string of digits generated as a result of step 2.

3. The users or devices check whether the string is the same in all devices. As an example, one user reads the digits aloud and the others check if their respective devices show the same string. The string may also be automatically checked for identity by one or more of the devices of the group, e.g. by transferring the strings generated by the devices to the one or more of the devices, for instance using reliable transmission such as infrared transmission. The one or more of the devices checks whether the received strings and possibly also the internally generated strings are identical with each other and, if so, the association is confirmed by the one or more of the devices.

4. If all devices show or have generated the same string, users accept the association on each of their device, e.g., by pressing a confirmation button.

The accepted association is then used in the communication between the users of this group, ensuring privacy.

The method is applicable when for example each device has a display capable of showing a short string (e.g. 4 digits), and a simple input facility (e.g., confirmation button).

The invention thus provides authenticated group key agreement in ad hoc scenarios. The invention can be used with Ad-hoc groups or Ad-hoc networks such as several computers in one room or in a restricted area such as a building, communicating with the other devices belonging to the same group or network, typically only for a limited time period such as a meeting, but not restricted to such a scenario.

The invention provides among others a data authentication protocol for the multi-party case by utilizing Diffie-Hellman key agreement, a method for authenticating multi-party session, and a device performing such steps.

Although preferred embodiments have been described above, the present invention is not limited thereto and intends to cover also all modifications, amendments, additions and deletions of features within the abilities of a person skilled in the art.

The invention claimed is:

1. A method, comprising:
   on a device that is one of three or more devices of a communication group, performing the following:
   sharing, with the other devices of the three or more devices, data which the three or more devices want to verify is the same in all of the three or more devices;
   selecting a random number;
   computing, using a first function, a value based on the random number;
   sending the computed value to other devices;
   waiting until computed values have been received from each of the other devices, each of the other devices selecting its respective random number and each computed value being computed by one of the other devices using its respective random number and using the first function and its respective random number to compute the computed value;
   sending the random number to the other devices;
   receiving respective random numbers from each of the other devices;
   checking, using the respective random number from each of the other devices and the first function, for each received computed value, whether the received computed value is correct; and
   in response to each received computed value being correct, calculating, using a second function, another value based on the random numbers from all of the three or more devices and one of the shared data or a unique representation of the shared data, the calculated other value being used for accepting or rejecting whether the shared data is verified as the same in all of the three or more devices.

2. The method according to claim 1, further comprising performing a key agreement with the other devices.

3. The method according to claim 1 wherein the computing the first function comprises a one-way hash function.

4. The method according to claim 2, wherein the key agreement is a multiparty authenticated Diffie-Hellman key agreement.

5. The method according to claim 1, wherein the device computes, or stores, a shared secret Diffie-Hellman key that is used as the shared data or as the unique representation of the shared data.

6. The method according to claim 1, wherein the three or more devices are user devices, computers, laptops, or mobiles, which want to form an ad-hoc group.

7. The method according to claim 2, comprising performing the key agreement before authenticating the key agreement, the authenticating the key agreement performed by using a key in the key agreement as the shared data or as the unique representation of the shared data.

8. The method according to claim 1, comprising performing an authenticated group key agreement.

9. The method according to claim 2, wherein performing a key agreement further comprises computing a shared secret key, the shared secret key comprising a Diffie-Hellman key K.

10. The method according to claim 2, wherein performing a key agreement further comprises using a public key based key-agreement method for agreeing with the other devices on a key.

11. The method according to claim 1, wherein the three or more devices of the group are adapted for, or use, wireless communication.

12. A computer program embodied on a computer readable non-transitory memory medium, the program being configured to control a computer to perform the following:
on a device that is one of three or more devices of a communication group, performing the following:
sharing, with the other devices of the three or more devices, data which the three or more devices want to verify is the same in all of the three or more devices;
selecting a random number;
computing, using a first function, a value based on the random number;
sending the computed value to other devices;
waiting until computed values have been received from each of the other devices, each of the other devices selecting its respective random number and each computed value being computed by one of the other devices using its respective random number and using the first function and its respective random number to compute the computed value;
sending the random number to the other devices;
receiving respective random numbers from each of the other devices;
checking, using the respective random number from each of the other devices and the first function, for each received computed value, whether the received computed value is correct; and
in response to each received computed value being correct, calculating, using a second function, another value based on the random numbers from all of the three or more devices and one of the shared data or a unique representation of the shared data, the calculated other value being used for accepting or rejecting whether the shared data is verified as the same in all of the three or more devices.

13. An apparatus comprising:
at least one processor; and
at least one memory including computer program code,
the at least one memory and the computer program code configured to, with the at least one processor, cause the apparatus to perform at least the following:
on a device that is one of three or more devices of a communication group, performing the following:
sharing, with the other devices of the three or more devices, data which the three or more devices want to verify is the same in all of the three or more devices;
selecting a random number;
computing, using a first function, a value based on the random number;
sending the computed value to other devices;
waiting until computed values have been received from each of the other devices, each of the other devices selecting its respective random number and each computed value being computed by one of the other devices using its respective random number and using the first function and its respective random number to compute the computed value;
sending the random number to the other devices;
receiving respective random numbers from each of the other devices;
checking, using the respective random number from each of the other devices and the first function, for each received computed value, whether the received computed value is correct; and
in response to each received computed value being correct, calculating, using a second function, another value based on the random numbers from all of the three or more devices and one of the shared data or a unique representation of the shared data, the calculated other value being used for accepting or rejecting whether the shared data is verified as the same in all of the three or more devices.

14. The method of claim 1, further comprising allowing a user to accept or reject the calculated other value.

15. The computer program of claim 12, further comprising performing a key agreement with the other devices.

16. The computer program of claim 12, further comprising computing, or storing, a shared secret Diffie-Hellman key that is used as the shared data or as the unique representation of the shared data.

17. The computer program of claim 15, comprising performing the key agreement before authenticating the key agreement, the authenticating the key agreement performed by using a key in the key agreement as the shared data or as the unique representation of the shared data.

18. The apparatus of claim 13, wherein the at least one memory and the computer program code are further configured to, with the at least one processor, cause the apparatus to perform at least the following: performing a key agreement with the other devices.

19. The apparatus of claim 13, wherein the at least one memory and the computer program code are further configured to, with the at least one processor, cause the apparatus to perform at least the following: computing, or storing, a shared secret Diffie-Hellman key that is used as the shared data or as the unique representation of the shared data.

20. The apparatus of claim 18, wherein the at least one memory and the computer program code are further configured to, with the at least one processor, cause the apparatus to perform at least the following: performing the key agreement before authenticating the key agreement, the authenticating the key agreement performed by using a key in the key agreement as the shared data or as the unique representation of the shared data.

* * * * *